(12) United States Patent
Park

(10) Patent No.: US 7,391,810 B2
(45) Date of Patent: Jun. 24, 2008

(54) HIGH-SPEED MOTION ESTIMATOR AND METHOD WITH VARIABLE SEARCH WINDOW

(75) Inventor: Hyun-sang Park, Cheonan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 721 days.

(21) Appl. No.: 10/440,684

(22) Filed: May 19, 2003

(65) Prior Publication Data

US 2004/0013197 A1     Jan. 22, 2004

(30) Foreign Application Priority Data

Jul. 22, 2002   (KR)  ............... 2002-43005

(51) Int. Cl.
*H04N 7/18* (2006.01)
(52) U.S. Cl. ............... 375/240.16; 375/240.17
(58) Field of Classification Search ............... 375/240.01–240.29
See application file for complete search history.

(56) References Cited

U.S. PATENT DOCUMENTS 5,731,850 A * 3/1998 Maturi et al. ............ 348/699
5,801,778 A * 9/1998 Ju .......................... 375/240.15

OTHER PUBLICATIONS

English Abstract Only.

* cited by examiner

*Primary Examiner*—Andy S Rao
(74) *Attorney, Agent, or Firm*—F. Chau & Associates, LLC

(57) ABSTRACT

A motion estimation apparatus and method capable of reducing the amount of computation required for motion estimation in the compression of moving images are provided, including a first part for decimating a reference macroblock at a decimation ratio of 4:1, decimating a search window of a predetermined size at a decimation ratio of 4:1, and estimating a first motion vector responsive to the 4:1 decimated macroblock and window, a second part responsive to the first part for decimating the reference macroblock and decimating the search window each at a decimation ratio of 2:1, and estimating at least one second motion vector responsive to the 2:1 decimated macroblock and window, and a third part responsive to the second part for performing a full search motion estimation on a block within horizontal and vertical ranges of $-N_{11}$ to $+N_{12}$ of the estimated first motion vector, estimating a third motion vector if one second motion vector was estimated, or performing full search motion estimation on a block within horizontal and vertical ranges of $-N_{21}$ to $+N_{22}$ of the estimated at least one second motion vector if two second motion vectors were estimated.

20 Claims, 3 Drawing Sheets

(a) CURRENT FRAME (b) PREVIOUS FRAME (a) CURRENT FRAME (b) PREVIOUS FRAME

| VIDEO | FULL SEARCH (dB) | PRESENT INVENTION (dB) |
|---|---|---|
| AKIYO | 40.95 | 40.97 |
| CONTAINER | 35.18 | 35.22 |
| FOREMAN | 31.20 | 30.89 |
| SILENT | 34.51 | 34.49 |

HIGH-SPEED MOTION ESTIMATOR AND METHOD WITH VARIABLE SEARCH WINDOW

BACKGROUND OF THE INVENTION

1. Field of the Invention

The present invention relates to motion estimation, and more particularly, to an apparatus and method for estimating motion at high speeds by varying the size of a search window.

2. Description of the Related Art

Motion estimation has played an important role in video compression and transmission. A technique known in video processing for estimating motion has been recommended by the Moving Pictures Expert Group ("MPEG") and H.261 standards, and is called a block matching algorithm ("BMA"). In the block matching algorithm, images are divided into blocks, and a best match block is selected for each block of a current frame by searching among all the blocks of a previous frame according to a matching criterion.

Motion estimation in compression of moving images requires a tremendous amount of computation. Therefore, what is desired is a method of effectively estimating motion that requires less power and fewer computations.

SUMMARY OF THE INVENTION

The above and other drawbacks and disadvantages of the prior art are addressed by embodiments of the present disclosure that provide motion estimation capable of reducing the power consumption necessary to compress moving images by reducing the amount of computation required for motion estimation in the compression of moving images.

Accordingly, a motion estimation apparatus and method capable of reducing the amount of computation required for motion estimation in the compression of moving images are provided, including a first part for decimating a reference macroblock at a decimation ratio of 4:1, decimating a search window of a predetermined size at a decimation ratio of 4:1, and estimating a first motion vector responsive to the 4:1 decimated macroblock and window, a second part responsive to the first part for decimating the reference macroblock and decimating the search window each at a decimation ratio of 2:1, and estimating at least one second motion vector responsive to the 2:1 decimated macroblock and window, and a third part responsive to the second part for performing a full search motion estimation on a block within horizontal and vertical ranges of $-N_{11}$ to $+N_{12}$ of the estimated first motion vector, estimating a third motion vector if one second motion vector was estimated, or performing full search motion estimation on a block within horizontal and vertical ranges of $-N_{21}$ to $+N_{22}$ of the estimated at least one second motion vector if two second motion vectors were estimated.

BRIEF DESCRIPTION OF THE DRAWINGS

The above features and advantages of the present invention will become more apparent by describing in detail an exemplary embodiment thereof with reference to the attached drawings in which.

DETAILED DESCRIPTION OF PREFERRED EMBODIMENTS

Figure 1:
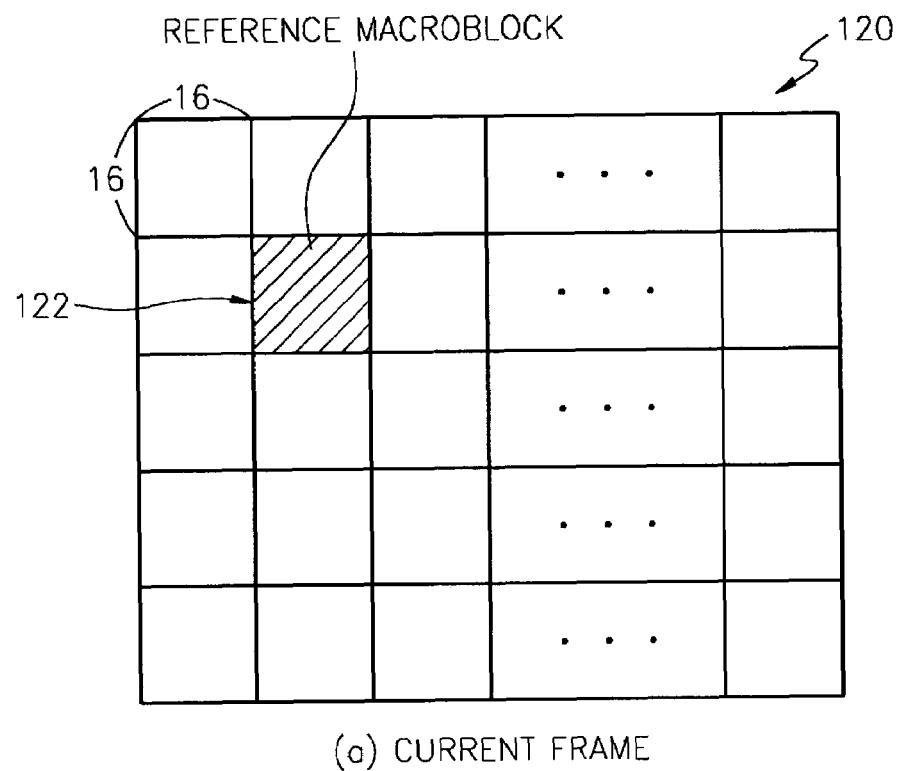
FIG. 1 is a diagram illustrating a conventional block matching method for estimating motion vectors.
Figure 1:
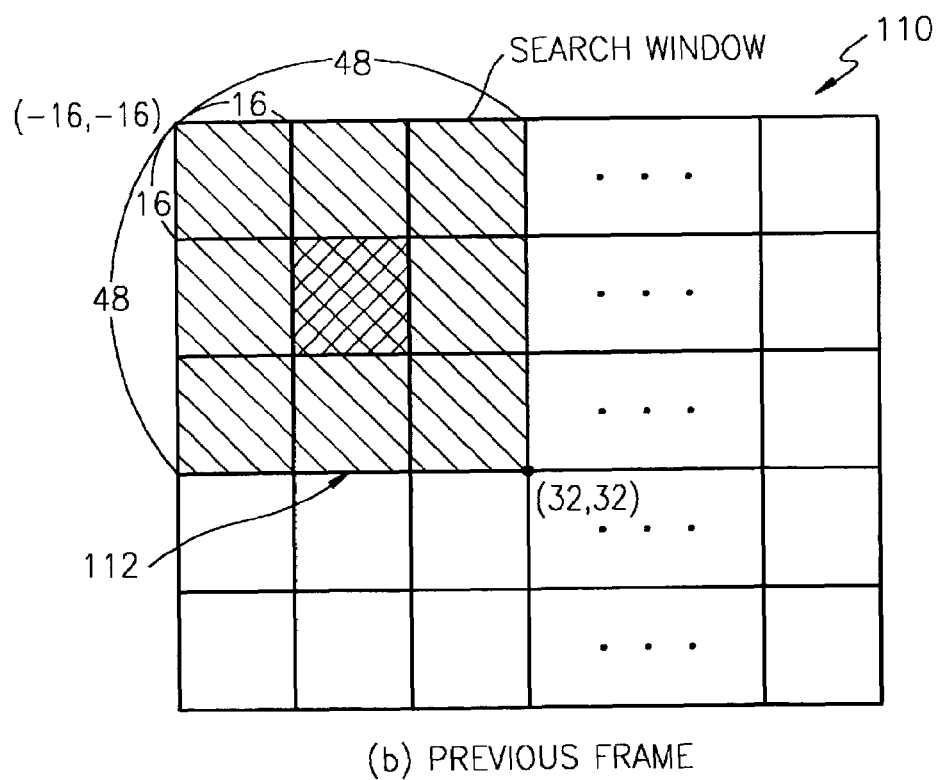

The present invention will be described more fully with reference to the accompanying drawings, in which a preferred embodiment of the invention is shown. The same reference numerals in different drawings represent the same elements.

As shown in FIG. 1, a diagram illustrating a conventional block matching method for estimating motion vectors includes a previous frame indicated generally by the reference numeral 110, and a current frame indicated generally by the reference numeral 120. For the previous frame 120, assume that a search region ranges from −16 to +32 in horizontal and vertical directions. Accordingly, a search window 112 of a previous frame 110 has a size of 48×48, and a reference macroblock or a reference window 122, for which a motion vector of the current frame 120 will be estimated, has a size of 16×16. The size of the search window 112 may be set up arbitrarily.

Figure 2:
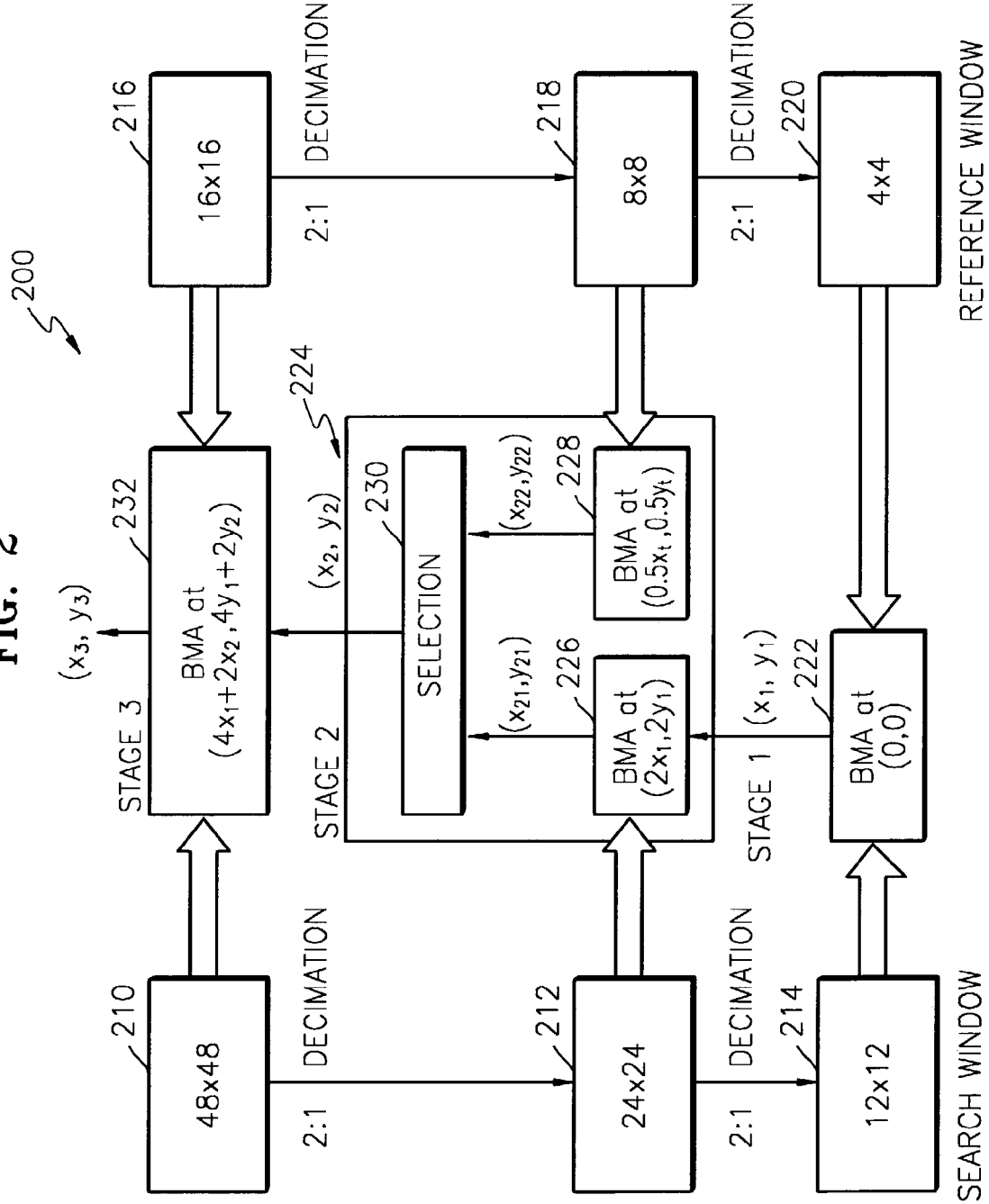
FIG. 2 is a diagram illustrating a motion estimation method according to a preferred embodiment of the present invention.

Turning to FIG. 2, a diagram illustrating a motion estimation method according to a preferred embodiment of the present invention is indicated generally by the reference numeral 200. Referring to FIG. 2, a motion estimation method or a motion estimation algorithm according to a preferred embodiment of the present invention has a hierarchical structure of three stages, and in a third stage where the largest amount of computation is required, the size of a search window varies.

Data from the search window 112 of FIG. 1 is received at block 210, decimated at 2:1 to block 212, and decimated again at 2:1 to block 214. Data from the reference window 122 of FIG. 1 is received at block 216, decimated at 2:1 to block 218, and decimated again at 2:1 to block 220. For the first stage, decimated data is received at a block matching algorithm ("BMA") block 222 from the blocks 214 and 220. For the second stage defined at block 224, the estimated motion vector is received from the block 222 to a BMA block 226, which also receives decimated data from the blocks 218 and 212, and passes the motion estimation result to a selection block 230. A BMA block 228 receives decimated data from the blocks 212 and 218, and passes the motion estimation result to the selection block 230. For the third stage, the estimated motion vector is passed from the selection block 230 to a BMA block 232, which outputs a newly determined motion vector.

Thus, in a first step, a motion estimator (not shown) or a main control unit ("MCU", not shown) decimates a search window having a size of 48×48 and a reference window having a size of 16×16 in horizontal and vertical directions with a ratio of 4:1. As a result of the decimation, a 4-by-4 reference macro block and a 12-by-12 search window are obtained, and a search region horizontally and vertically ranges from −4 to +3.

The motion estimator or the MCU performs full search motion estimation on the 12-by-12 search window and the 4-by-4 reference window and determines, as a motion vector for the first step, a block in the 12-by-12 search window, which has the smallest sum of absolute difference ("SAD"), i.e., a 4-by-4 block in the 12-by-12 search window, which is the best match for the 4-by-4 reference window.

Here, when the motion vector estimated in the first step is referred to as (x1, y1), $-4 \leq x1, y1 \leq 3$. Accordingly, the number of absolute difference ("AD") operations necessary to calculate an SAD is 16×64.

In a second step, the motion estimator or the MCU horizontally and vertically decimates the 48-by-48 search window and the 16-by-16 reference window with a ratio of 2:1. As a result of the decimation, an 8-by-8 reference window and a 24-by-24 search window are obtained.

The motion estimator or the MCU determines a motion vector by performing full search motion estimation on a block within horizontal and vertical ranges of −2 to +2 of the motion vector (x1, y1). When the motion vector determined in the second step is referred to as (x21, y21), $-2 \leq x21, y21 \leq +2$.

The motion estimator may further estimate another motion vector in order to enhance the performance of motion estimation in the second step. Since motion vectors for macroblocks adjacent to the reference macroblock have already been estimated, the motion estimator determines another motion vector by performing full search motion estimation on a block within horizontal and vertical ranges of −2 to +2 of a predetermined motion vector. Here, the predetermined motion vector is obtained by scaling or reflecting a median vector (xt, yt) of the motion vectors for the macroblocks adjacent to the reference macroblock into the space of the second step.

When the newly determined motion vector is referred to as (x22, y22), $-2 \leq x22, y22 \leq +2$. The motion vector (x22, y22) is estimated only when the median vector (xt, yt) is not the same as the motion vector (x1, y1) obtained in the first step, in other words, only when $(2x1, 2y1) \neq (0.5xt, 0.5yt)$. Here, the numbers 2 and 0.5 are scaling constants used to scale or reflect a vector into the space of the second step.

The motion estimator or the MCU selects, as a final motion vector, a vector having a smaller SAD between the motion vector (x21, y21) and the motion vector (x22, y22) and designates the final motion vector as (x2, y2). Therefore, while 64×25 AD operations are required to calculate an SAD in the case of estimating only one motion vector, 64×25×2 AD operations are required to calculate an SAD in the case of estimating two motion vectors.

In the third step, the motion estimator or the MCU exploits original images, which have not been decimated. In the third step, a reference macroblock has a size of 16×16, and a search window has a size of 48×48. In a case where only the motion vector (x2, y2) has been estimated in the second step, the motion estimator determines a motion vector by performing full search motion estimation on a block within horizontal and vertical ranges of $-N_{11}$ to $+N_{12}$ of the motion vector (x2, y2) obtained in the second step. When the newly determined motion vector is referred to as (x3, y3), $-N_{11} \leq x3, y3 \leq +N_{12}$. Here, $N_{11}$ and $N_{12}$ may be each set to 1.

If two motion vectors (x21, y21) and (x22, y22) have been obtained in the second step, the motion estimator determines a motion vector by performing full search motion estimation on a block within horizontal and vertical ranges of $-N_{21}$ to $+N_{22}$ of the motion vector (x2, y2). When the newly determined motion vector is referred to as (x3, y3), $-N_{21} \leq x3, y3 \leq +N_{22}$. Here, $N_{21}$ and $N_{22}$ may be each set to 2. Preferably, $N_{21}$ is greater than $N_{11}$, and $N_{22}$ is greater than $N_{12}$.

Therefore, in a case where only one motion vector has been obtained in the second step, 256×9 AD operations are required to calculate an SAD. In a case where two motion vectors have been obtained in the second step, 256×25 AD operations are required to calculate an SAD.

Accordingly, a finally determined motion vector (x, y) can be defined by Equation (1) below.

$$x = 4x1 + 2x2 + x3 \quad (1)$$

$$y = 4y1 + 2y2 + y3 \quad (1)$$

In equation (1), the numbers 4 and 2 are scaling constants.

In short, in a case where only one motion vector has been obtained in the second step, 4928 AD operations are required to estimate the finally determined motion vector (x, y). On the other hand, in a case where two motion vectors have been obtained in the second step, 10624 AD operations are required to estimate the finally determined motion vector (x, y).

Figure 3:
FIG. 3 is a table comparing the video quality of moving images compressed following a motion estimation method according to a preferred embodiment of the present invention with the video quality of moving images compressed following a conventional motion estimation method.

Turning now to FIG. 3, a table is indicated generally by the reference numeral 300. The table 300 compares the video quality of moving images compressed following a motion estimation method according to a preferred embodiment of the present invention with the video quality of moving images compressed following a conventional motion estimation method. Specifically, video qualities of moving images when compressing the moving images using a baseline encoder proposed by H.263 standards are represented by peak signal noise ratios ("PSNRs").

The moving images used in the comparison are quarter common interface format ("QCIF") images and are compressed with 15 frames/sec and 64 Kbps. The high-speed motion estimation method according to the present invention provides a higher video quality than a conventional motion estimation method using a full search algorithm.

Thus, the present invention provides a motion estimation method that is capable of reducing power consumption required to compress moving images by reducing the amount of computation necessary to estimate motion during the compression of the moving images.

According to an aspect of the present invention, there is provided a hierarchical motion estimation method in which motion estimation is hierarchically performed on each macroblock. The method includes a first step of decimating a reference macroblock and a search window having a predetermined size with a ratio of 4:1 and estimating a motion vector, a second step of decimating the reference macroblock and the search window with a ratio of 2:1 and estimating at least one motion vector, and a third step of performing full search motion estimation on a block within horizontal and vertical ranges of $-N_{11}$ to $+N_{12}$ of an estimated motion vector and estimating a motion vector if one motion vector has been estimated in the second step, or performing full search motion estimation on a block within horizontal and vertical ranges of $-N_{21}$ to $+N_{22}$ of an estimated motion vector if two motion vectors have been estimated in the second step. Preferably, $N_{11}$ is smaller than $N_{21}$ and $N_{12}$ is smaller than $N_{22}$.

Preferably, in the third step, if the motion vector estimated in the first step is the same as a motion vector obtained by scaling a median vector of motion vectors for macroblocks adjacent to the reference macro block in the second step, a motion vector is estimated by performing full search motion estimation on the block within horizontal and vertical ranges of $-N_{11}$ to $+N_{12}$ of the motion vector estimated in the first step.

According to another aspect of the present invention, there is provided a hierarchical motion estimation method in which motion estimation is hierarchically performed on each macroblock. The method includes a first step of decimating a reference macroblock and a search window having a predetermined size with a ratio of 4:1, performing full search motion estimation on the decimated reference macroblock and the decimated search window, and estimating a motion vector having the smallest sum of absolute difference ("SAD"), a second step of decimating the reference macroblock and the search window with a ratio of 2:1, performing full search motion estimation on a block within predetermined horizontal and vertical ranges of the motion vector estimated in the first step, and estimating a first motion vector and/or a second motion vector, and a third step of performing full search motion estimation on a block within horizontal and vertical ranges of $-N_{11}$ to $+N_{12}$ of the first motion vector using the reference macroblock and the search window, and estimating a motion vector if only the first motion vector has been estimated in the second step, or performing full search motion estimation on a block within horizontal and vertical ranges of $-N_{21}$ to $+N_{22}$ of a motion vector having a smaller SAD between the first and second motion vectors and estimating a motion vector if both the first and second motion vectors have been estimated in the second step.

Preferably, the second motion vector is estimated when the motion vector estimated in the first step is different from a motion vector obtained by scaling a median vector of motion vectors for macroblocks adjacent to the reference macroblock in the second step. Preferably, $N_{11}$ is smaller than $N_{21}$ and $N_{12}$ is smaller than $N_{22}$.

According to still another aspect of the present invention, there is provided a hierarchical motion estimation method in which motion estimation is hierarchically performed on each macroblock. The method includes a first step of decimating a reference macroblock and a search window having a predetermined size with a ratio of 4:1, performing full search motion estimation on the decimated reference macroblock and the decimated search window, and estimating a motion vector having the smallest sum of absolute difference ("SAD"), a second step of decimating the reference macroblock and the search window with a ratio of 2:1, performing full search motion estimation on a block within predetermined horizontal and vertical ranges of the motion vector estimated in the first step, and estimating a first motion vector, or further estimating a second motion vector and then estimating a motion vector having a smaller SAD between the first and second motion vectors if the motion vector estimated in the first step is different from a motion vector obtained by scaling a median vector of motion vectors for macroblocks adjacent to the reference macroblock in the second step, and a third step of performing full search motion estimation on a block within horizontal and vertical ranges of $-N_{11}$ to $+N_{12}$ of the first motion vector using the reference macroblock and the search window and estimating a motion vector, if only the first motion vector has been estimated in the second step, or performing full search motion estimation on a block within horizontal and vertical ranges of $-N_{21}$ to $+N_{22}$ of the motion vector having a smaller SAD between the first and second motion vectors and estimating a motion vector, if both the first and second motion vectors have been estimated in the second step. Preferably, $N_{11}$ is smaller than $N_{21}$ and $N_{12}$ is smaller than $N_{22}$.

As described above, the motion estimation method according to the present invention is capable of reducing the amount of computations required to compress moving images, thus enhancing the efficiency of compressing the moving images.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

For example, the present invention may be embodied as a computer readable code in a computer readable medium. Here, the computer readable medium may be any recording apparatus capable of storing data that can be read by a computer system, e.g., a read-only memory ("ROM"), a random access memory ("RAM"), a compact disc read-only memory ("CD-ROM"), a magnetic tape, a floppy disk, an optical data storage device, and the like. The computer readable recording medium can be dispersively installed in a computer system connected to a network, and stored and accomplished as a computer readable code by a distributed computing environment.

Further, the teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A hierarchical motion estimation method in which motion estimation is hierarchically performed on a macroblock, the method comprising:

a first step of decimating a reference macroblock at a decimation ratio per dimension of 4:1, decimating a search window of a predetermined size at a decimation ratio per dimension of 4:1, and estimating a first motion vector responsive to the 4:1 decimated macroblock and window;

a second step of decimating the reference macroblock and decimating the search window each at a decimation ratio per dimemsion of 2:1, and estimating at least one second motion vector responsive to the 2:1 decimated macroblock and window; and a third step of performing a full search motion estimation on a block within horizontal and vertical ranges of +N11 to +N12 of the estimated first motion vector, estimating a third motion vector if one motion vector was estimated in the second step, or performing full search motion estimation on a block within horizontal and vertical ranges of −N21 to +N22 of the estimated at least one second motion vector if two motion vectors were estimated in the second step.

2. The method of claim 1, wherein N11 is smaller than N21, and N12 is smaller than N22.

3. The method of claim 1, wherein in the third step, if the motion vector estimated in the first step is the same as a motion vector obtained by scaling a median vector of motion vectors for macroblocks adjacent to the reference macro block in the second step, a motion vector is estimated by performing full search motion estimation on the block within horizontal and vertical ranges of −N11 to +N12 of the motion vector estimated in the first step.

4. A hierarchical motion estimation method as defined in claim 1 wherein:
said first step further comprises performing full search motion estimation on the decimated reference macroblock and the decimated search window and estimating a first motion vector having the smallest difference measure;
said second step further comprises performing full search motion estimation on a block within predetermined horizontal and vertical ranges of the motion vector estimated in the first step, and estimating at least one second motion vector comprises estimating not more than two second motion vectors; and
said third step further comprises determining whether one or two second motion vectors were estimated, and if one second motion vector was estimated, using the reference macroblock and the search window for full search motion estimation relative to the one second motion vector to estimate a third motion vector, and if two second motion vectors were estimated, performing full search motion estimation on a block within horizontal and vertical ranges of −N21 to +N22 of a motion vector having a smaller difference measure between the two second motion vectors to estimate a third motion vector.

5. The method of claim 4, wherein the second motion vector is estimated when the motion vector estimated in the first step is different from a motion vector obtained by scaling a median vector of motion vectors for macroblocks adjacent to the reference macroblock in the second step.

6. The method of claim 4, wherein N11 is smaller than N21, and N12 is smaller than N22.

7. A hierarchical motion estimation method as defined in claim 4, said second step further comprising selecting the second motion vector having a smaller difference measure between the two second motion vectors if the first motion vector estimated in the first step is different from a motion vector obtained by scaling a median vector of motion vectors for macroblocks adjacent to the reference macroblock in the second step.

8. The method of claim 7, wherein N11 is smaller than N21, and N12 is smaller than N22.

9. A method as defined in claim 4 wherein said difference measure is the sum of absolute differences ("SAD").

10. A method as defined in claim 7 wherein said difference measure is the sum of absolute differences ("SAD").

11. A computer-readable medium tangibly embodying a program of instructions executable by a computer to perform program steps for hierarchical motion estimation, the program steps comprising:
decimating a reference macroblock at a decimation ratio per dimension of 4:1, decimating a search window of a predetermined size at a decimation ratio per dimension of 4:1, and estimating a first motion vector responsive to the 4:1 decimated macroblock and window;
decimating the reference macroblock and decimating the search window each at a decimation ratio per dimension of 2:1, and estimating at least one second motion vector responsive to the 2:1 decimated macroblock and window; and
performing a full search motion estimation on a block within horizontal and vertical ranges of −N11 to +N12 of the estimated first motion vector, estimating a third motion vector if one second motion vector was estimated, or performing full search motion estimation on a block within horizontal and vertical ranges of −N21 to +N22 of the estimated at least one second motion vector if two second motion vectors were estimated.

12. A computer-readable medium as defined in claim 11, the steps further comprising:
performing full search motion estimation on the 4:1 decimated reference macroblock and the 4:1 decimated search window and estimating a first motion vector having the smallest difference measure;
performing full search motion estimation on a block within predetermined horizontal and vertical ranges of the estimated first motion vector, and estimating at not more than two second motion vectors; and
determining whether one or two second motion vectors were estimated, and if one second motion vector was estimated, using the reference macroblock and the search window for full search motion estimation relative to the one second motion vector to estimate a third motion vector, and if two second motion vectors were estimated, performing full search motion estimation on a block within horizontal and vertical ranges of −N21 to +N22 of a motion vector having a smaller difference measure between the two second motion vectors to estimate a third motion vector.

13. A computer-readable medium as defined in claim 12, the steps further comprising:
selecting between the two second motion vectors the second motion vector having a smaller difference measure if the first motion vector is different from a motion vector obtained by scaling a median vector of motion vectors for macroblocks adjacent to the reference macroblock.

14. A computer-readable medium as defined in claim 11, the steps further comprising:
estimating the third motion vector by performing full search motion estimation on the block within horizontal and vertical ranges of −N11 to +N12 of the first motion vector if the first motion vector is the same as a motion vector obtained by scaling a median vector of motion vectors for macroblocks adjacent to the reference macroblock.

15. A computer-readable medium as defined in claim 11 wherein N11 is smaller than N21 and N12 is smaller than N22.

16. A computer-readable medium as defined in claim 12, the steps further comprising estimating the second motion vector when the first motion vector is different from a motion vector obtained by scaling a median vector of motion vectors for macroblocks adjacent to the reference macroblock.

17. A computer-readable medium as defined in claim 12 wherein said difference measure is the sum of absolute differences ("SAD").

18. A hierarchical motion estimation apparatus for hierarchically performing motion estimation on a macroblock, the apparatus comprising:
stage one means for decimating a reference macroblock at a decimation ratio per dimension of 4:1, decimating a search window of a predetermined size at a decimation ratio per dimension of 4:1, and estimating a first motion vector responsive to the 4:1 decimated macroblock and window;
stage two means responsive to said stage one means, the stage two means for decimating the reference macroblock and decimating the search window each at a decimation ratio per dimension of 2:1, and estimating at least one second motion vector responsive to the 2:1 decimated macroblock and window; and
stage three means responsive to said stage two means, the stage three means for performing a full search motion estimation on a block within horizontal and vertical ranges of −N11 to +N12 of the estimated first motion vector, estimating a third motion vector if one second motion vector was estimated, or performing full search motion estimation on a block within horizontal and vertical ranges of −N21 to +N22 of the estimated at least one second motion vector if two second motion vectors were estimated.

19. A hierarchical motion estimation apparatus as defined in claim 18 wherein:

said stage one means comprises a 4:1 search window decimator, a 4:1 reference macroblock decimator, and a first block matching algorithm ("BMA") unit implemented at (0, 0) in signal communication with both 4:1 decimators;

said stage two means comprises a 2:1 search window decimator, a 2:1 reference macroblock decimator, a second BMA unit implemented at (2x1, 2y1) in signal communication with the 2:1 search window decimator and the first BMA, a third BMA unit implemented at (0.5xt, 0.5yt) in signal communication with the 2:1 reference macroblock decimator, and a selection unit in signal communication with the second and third BMA units; and said stage three means comprises a search window unit, a reference macroblock unit, and a fourth BMA unit implemented at (4x1 +2x2, 4y1 +2y2) in signal communication with the search window unit, the reference macroblock unit, and the selection unit for providing a final motion vector.

20. A hierarchical motion estimation apparatus as defined in claim 19 wherein the selection unit comprises a difference measure portion for determining a sum of absolute differences ("SAD") between two motion vectors.

* * * * *